United States Patent Office 2,978,734
Patented Apr. 11, 1961

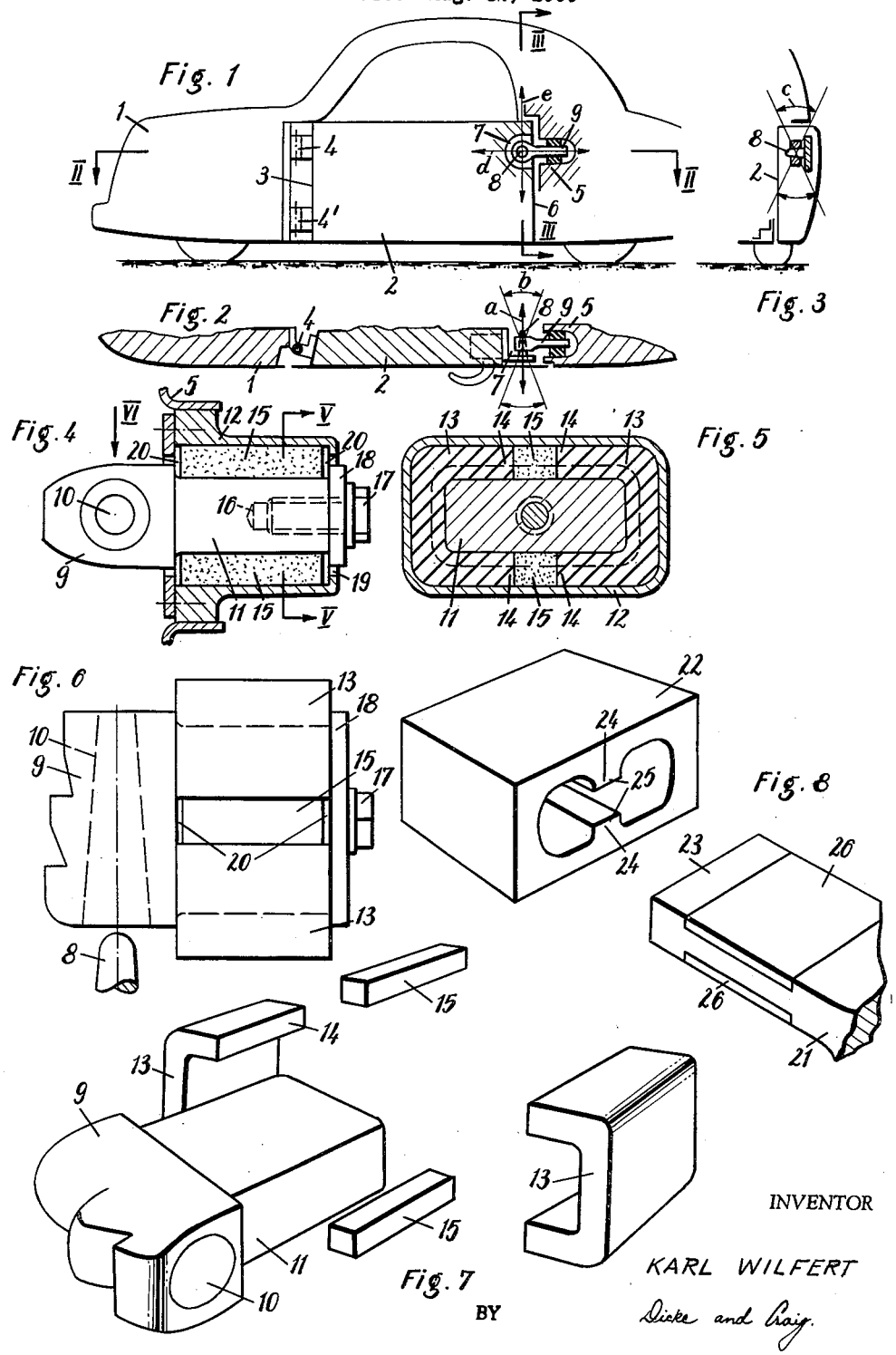

2,978,734
DOOR LOCATING DEVICE FOR VEHICLES

Karl Wilfert, Stuttgart-Degerloch, Germany, assignor to Daimler-Benz Aktiengesellschaft, Stuttgart-Unterturkheim, Germany Filed Aug. 12, 1955, Ser. No. 528,025

Claims priority, application Germany Aug. 24, 1954

6 Claims. (Cl. 16—82)

The present invention relates to door locating means, especially for doors of motor vehicles, that is, to means for locating and maintaining such doors in an accurately fixed position relative to the vehicle body.

A common difficulty experienced for a long time in the manufacture of motor vehicles, and especially passenger cars resides in the development of suitable means for mounting the doors on the car body so as to fit properly into the door frame despite small inaccuracies in size or shape, and so as to retain their proper position to the door frames regardless of the wear and stresses to which the door and the hinges thereof are subjected when being slammed shut, and regardless of the vibrations to which the car is subjected especially when driving over an uneven road which sooner or later result in small distortions of the car body, and especially in the doors and door frames thereof. In order to overcome these difficulties, special locating means have been provided on the door and door frame usually consisting of some form of lug or other projection on the free vertical side of the door and a corresponding portion usually in the form of an eyelet-shaped seat on the door frame, or vice versa. For compensating inaccuracies in manufacture, as well as minor distortions of the door relative to the door frame, as above-described, either one or both of these two members were given inclined or conical surfaces. For the same reasons, and also for cushioning the door and absorbing the noise of shutting the same, and of the rattling during the driving, at least one of these cooperating members was usually secured on the door or door frame by means of a resilient mounting which permitted the respective member to yield to a certain extent in any direction.

Unfortunately, it has been found that such resilient mounting means, although satisfactory insofar as the absorption of noise was concerned, did not provide an adequate support for the door which was otherwise only supported on the opposite side by its hinges, and allowed the same too much movement in a vertical direction, especially by rattling in driving, thus permitting the door gradually to settle or sag which, in turn, resulted in an improper fit of the door relative to its frame, as well as an excessive strain and wear on the hinges.

It is the principal object of the present invention to eliminate these disadvantages by the provision of door locating means, at least one of which is mounted on the door or door frames so as to be sufficiently resilient in all directions except in the vertical direction where the respective member is substantially rigidly secured.

Such a manner of mounting the locating means, that is, either the lug or the eyelet-shaped seat, or both, so as to be partly resilient and partly solid or stationary relative to the part of the car to which it is secured, prevents the door from gradually sagging on the side carrying the lock, even though the car might be subjected to rough usage on uneven roads. At the same time, however, the new mounting according to the present invention affords all the advantages of fully resilient mountings, namely, of compensating for inaccuracies of fitting in all but a vertical direction, of cushioning the locating means relative to each other and relative to the car body, and of deadening the noise of shutting the door and of its vibration when driving. A further very important advantage gained by the invention is that the strain and wear upon the door hinges is considerably reduced so that they will always operate smoothly and properly, and without any squeaking noise due to overloading.

A further feature of the invention resides in the particular manner of mounting the rectangular shaft within the housing so as to be retained thereby but still to allow a certain resilient movement of the shaft relative to the housing in a substantially axial direction of the shaft.

Still another important feature of the invention consists in making at least one of the contacting surfaces, that is, either the surface of the central portion of the shaft carrying the eyelet member or of the rectangular bars which are interposed between the two U-shaped resilient members, of a hard material.

Further objects, features, and advantages of the present invention will be apparent from the following detailed description thereof and also from the accompanying drawing, in which:

Fig. 1 shows a diagrammatic side view, partly in cross section, of a passenger car with a side door which is provided with a locating device according to the invention;

Fig. 2 shows a longitudinal cross section taken along line II—II of Fig. 1;

Fig. 3 shows a vertical cross section taken along line III—III of Fig. 1;

Fig. 4 shows an enlarged vertical cross section of the new mounting of the eyelet member as shown in a side view;

Fig. 5 shows a cross section taken along line V—V of Fig. 4;

Fig. 6 shows a top view of the eyelet member according to Fig. 4 with the adjacent parts of the car body being omitted for better illustration;

Fig. 7 shows an exploded perspective view of the eyelet member and the solid and resilient elements of its mounting; while.

Fig. 8 shows an exploded perspective view of an eyelet member and its mounting according to a modification of the invention.

Referring to the drawing, Figs. 1 to 3 diagrammatically illustrate a motor vehicle, for example, a passenger car 1, with side doors 2. The lateral front edge 3 of each of doors 2 is mounted in the usual manner by means of two hinges 4 and 4' on a stationary door frame 5 of the car body. On its rear edge 6, door 2 is also provided in the usual manner with a door lock 7, details of which are not particularly shown in the drawing, as the lock itself does not constitute an essential feature of the invention. Lock 7 is provided with a lug member 8 which is rigidly mounted on door 2 and extends substantially in a horizontal direction. When the door 2 is being closed, lug member 8 cooperates with an eyelet member 9 which is resiliently mounted within the stationary door frame 5 within a plane which coincides with that of lug member 8. Eye member 9 is provided with a substantially horizontal aperture 10, as shown in Figs. 4 and 6, which is adapted to receive the lug member 8. Both members 8 and 9 are preferably of conical shape, the corresponding conical surfaces facilitating the two members to be accurately centered relative to each other, thus compensating for minor inaccuracies in their assembly.

For mounting eye member 9 within the stationary door frame 5 on the side opposite to that carrying the hinges 4 and 4', the same is provided with a shaft 11 of substantially oblong rectangular cross section which is enclosed firmly and almost entirely within a resilient, relatively thick liner of sound-proofing material, for example, rubber, which, in turn, is tightly enclosed within a housing 12 which is mounted substantially horizontally within door frame 5. As shown in Figs. 4 and 5, the resilient liner consists of two U-shaped members 13, preferably of rubber or similar material which almost entirely enclose the rectangular shaft 11 from its two opposite narrow sides. A pair of elongated rectangular bars 15 are interposed between the opposite free ends 14 of the resilient members 13 both above and below shaft 11 and substantially within a central vertical plane thereof. Bars 15 preferably consist of a hard material and are closely fitted between housing 12 and the opposite surfaces of shaft 11, extending substantially along the entire length of shaft 11.

As likewise shown in Figs. 4 to 6, shaft 11 is provided at its rear end with a threaded bore 16 extending in a longitudinal direction thereof. A locking plate 18 which also extends over the adjacent end portions of the resilient members 13 and bars 15 is mounted on the free end of shaft 11 and secured thereto by a bolt 17. Such manner of mounting assures, on the one hand, that the resilient members 13 and bars 15 will be secured to the rectangular shaft 11 against substantial movement in the longitudinal direction thereof while, on the other hand, as a result of a rear aperture 19 in the housing 12 which also encloses and confines the resilient members 13 toward the rear end thereof, a certain degree of resiliency of the eye member 9 in the longitudinal direction of shaft 11 will be obtained relative to housing 12. Such resiliency in the longitudinal direction is also possible due to the fact that bars 15 do not extend over the entire length of the rectangular shaft 11 but terminate in front at a point short of a shoulder forming the rear end of eye member 9, and at the rear at a point short of the rear wall of housing 12 and locking plate 18, thus leaving free spaces 20 at both ends of resilient members 15.

Such resilient mounting of the entire eye member 9, 11 allows the eye portion thereof adequate resiliency in the directions shown in Figs. 1 to 3 by arrows $a$, $b$, $c$ and $d$ within the limits of the resiliency of the members 13 and, on the other hand, assures that eye member 9, due to the bars 15, will be rigidly mounted only in the vertical direction, as shown by arrow $e$, so as to prevent the closed door 2 from gradually sagging down at its rear edge 6 under its own weight and as the result of the distortion of the door 2 relative to door frame 5 due to the vibrations and shocks to which the car body is subjected when being driven on uneven roads.

The modification of the invention as shown in Fig. 8 differs from the embodiment previously described merely by a difference in the construction of the eye member 21 and by a corresponding difference in the housing 22. In place of the separate bars 15, as shown in Figs. 1 to 7, the central part of housing 22 at the wider sides 24 thereof has a pair of opposite ribs 25 which extend along the entire length of housing 22 and abut against the wider sides of the rectangular shaft 23 forming an extension of the eye member 21. The remainder of housing 22 encloses shaft 23 at a distance therefrom, the intervening space being designed to hold resilient members 13 similar to those as shown in Figs. 1 to 7. The rectangular shaft 23 is further provided with recessed portions into which flat inserts 26 of hard material are fitted which take the place of bars 15 in Figs. 1 to 7. In the assembled condition, ribs 25 abut against the outer surface of inserts 26 and thus serve to secure shaft 23 in a fixed position in a vertical direction within housing 22.

The operation and effect of both preferred embodiments of the invention as illustrated in Figs. 4 to 7 and 8, respectively, is identical insofar as the resilient U-shaped members 13 allow the eye member 9, 11 or 21, 23, respectively, an adequate resilient movement in lateral as well as in forward and rearward directions, while the solid inserts 15 or 26, respectively, of hard material rigidly brace and secure the door so as to prevent any vertical movement thereof relative to the door frame, thus also preventing the free end of the door from sagging and from exerting an undue strain upon the hinges.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. Means for fastening a vertically pivoted door of a motor vehicle to a side wall of said vehicle, comprising a locating device secured to said side wall, a second member mounted on said door in such a position that said second member engages said locating device when said door is closed, said locating device comprising a locating member including an oblong substantially rectangular shaft, the wider sides of said shaft being disposed substantially horizontally, a housing of solid, non-resilient material surrounding said shaft and having an inner wall, a pair of ribs projecting inwardly from opposite sides of said inner wall for positive engagement with the wider sides of said shaft and at approximately the center of said wider sides, the remainder of said inner wall being spaced from said shaft, and resilient members completely filling the spaces between said shaft and the remainder of said inner wall.

2. Means for fastening a vertically pivoted door of a motor vehicle to a side wall of said vehicle, comprising a locating device secured to said side wall, a second member mounted on said door in such a position that said second member engages said locating device when said door is closed, said locating device comprising a locating member including a shaft, a pair of hard non-resilient members engaging vertically aligned top and bottom portions of said shaft, said portions being located in a substantially vertical central plane extending through said shaft, and a pair of resilient members for supporting the remaining portions of said shaft, said resilient members laterally abutting said non-resilient members.

3. Means for fastening a vertically pivoted door of a motor vehicle to a side wall of said vehicle, comprising a locating device secured to said side wall, a second member mounted on said door in such a position that said second member engages said locating device when said door is closed, said locating device comprising a locating member including an oblong, substantially rectangular shaft, the wider sides of said shaft being disposed substantially horizontally, a housing surrounding said shaft, a pair of hard, non-resilient members interposed between said shaft and said housing and engaging with vertically aligned portions of the wider sides of said shaft, and a pair of resilient members of substantially U-shaped cross section embracing said shaft from the narrower sides thereof with the two outer ends of said each U-shaped member also engaging the sides of said non-resilient members.

4. Means for fastening a vertically pivoted door of a motor vehicle to a side wall of said vehicle, comprising a locating device secured to said wall, a second member mounted on said door in such a position that said second member engages said locating device when said door is closed, said locating device including a locating member, said locating member comprising a shaft, a pair of hard, non-resilient members engaging vertically aligned top and bottom portions of said shaft, said portions being located substantially in the vertical central plane of said shaft, and a pair of resilient members engaging the other portions of said shaft and laterally abutting against said non-resilient members.

5. Fastening means for vehicle doors according to claim 3, wherein said housing has an end wall, a central aperture in said end wall, a locking plate mounted on the rear end of said shaft, said plate being disposed within said aperture but spaced from the walls thereof and extending outwardly over a part of the rear ends of said resilient and nonresilient members, said end wall forming a flange extending inwardly over another part of the rear ends of said resilient and nonresilient members, but spaced from said locking plate, said resilient and nonresilient members having a length slightly shorter both in front and at the rear than the length of said shaft and the length of said housing, so that said shaft is permitted a certain resilient movement in a substantially horizontal direction while sliding along said nonresilient members.

6. Fastening means for vehicle doors according to claim 1, wherein the portions of the wider sides of said shaft which are in direct engagement with said ribs consist of inserts of a hard material fitted into corresponding recesses in said shaft.

References Cited in the file of this patent

UNITED STATES PATENTS

| | | |
|---|---|---|
| 1,875,453 | Haskins | Sept. 6, 1932 |
| 1,903,365 | Haskins et al. | Apr. 4, 1933 |
| 1,947,524 | Horldt | Feb. 20, 1934 |
| 1,950,984 | Houston | Mar. 13, 1934 |
| 2,046,612 | Devereaux | July 7, 1936 |
| 2,074,385 | Geyer | Mar. 23, 1937 |

FOREIGN PATENTS

| | | |
|---|---|---|
| 450,561 | Great Britain | July 21, 1936 |